US008287623B2

(12) United States Patent
Manabe (10) Patent No.: US 8,287,623 B2
(45) Date of Patent: Oct. 16, 2012

(54) METHOD OF HEAP OR DUMP LEACHING OF COPPER FROM COPPER SULFIDE ORE

(75) Inventor: Manabu Manabe, Ibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 446 days.

(21) Appl. No.: 12/617,934

(22) Filed: Nov. 13, 2009

(65) Prior Publication Data

US 2011/0041654 A1      Feb. 24, 2011

(30) Foreign Application Priority Data

Aug. 24, 2009   (JP) .................................. 2009-193197

(51) Int. Cl.
*C22B 3/08* (2006.01)
(52) U.S. Cl. ................................ 75/742; 423/27; 423/41
(58) Field of Classification Search .................... 75/742; 432/27, 41
See application file for complete search history.

(56) References Cited

U.S. PATENT DOCUMENTS

| 4,003,740 | A | | 1/1977 | Huggins et al. |
| 4,256,553 | A | | 3/1981 | Baczek et al. |
| 5,989,311 | A | * | 11/1999 | Han et al. .................. 75/743 |
| 6,168,766 | B1 | | 1/2001 | Imai et al. |
| 6,537,440 | B1 | | 3/2003 | Richmond et al. |
| 6,802,888 | B2 | | 10/2004 | Kohr et al. |
| 2004/0144209 | A1 | | 7/2004 | Faine et al. |
| 2005/0044990 | A1 | | 3/2005 | Shaw et al. |
| 2005/0067299 | A1 | | 3/2005 | Haiki et al. |
| 2010/0018349 | A1 | * | 1/2010 | Manabe .................. 75/743 |

FOREIGN PATENT DOCUMENTS

| AU | 2009201732 A1 | 2/2010 |
| CL | 1665-2003 A | 8/2003 |
| CL | 2486-2004 A | 9/2004 |
| CL | 1026-2009 A | 4/2009 |
| WO | WO 9808585 A1 * | 3/1998 |
| WO | WO 2007/093667 A1 | 8/2007 |

OTHER PUBLICATIONS

Australian Government Office Action, Appl. No. 2009238385, Aug. 23, 2010, pp. 1-2.
Australian Government Office Action, Appl. No. 2009238385, Mar. 22, 2010, pp. 1-2.
Chile Office Action for Appl. No. 2122-2009 dated Apr. 16, 2012 (w/ partial English translation).

* cited by examiner

*Primary Examiner* — George Wyszomierski
*Assistant Examiner* — Tima M McGuthry Banks
(74) *Attorney, Agent, or Firm* — Birch, Stewart, Kolasch & Birch, LLP (57) ABSTRACT

Disclosed is a method of efficiently leaching copper not only from a readily-soluble copper ore but also a poorly-soluble copper sulfide ore partially containing or consisting of chalcopyrite and/or covellite by means of ore heap leaching under versatile conditions for actual operation. Also disclosed is a method of leaching copper from a copper sulfide ore, including leaching copper from an ore including a copper sulfide ore by heap or dump leaching with the use of a sulfuric acid solution containing ferric (III) ions and iodide ions at a total iodine concentration of 8 to 100 mg/L as a leaching solution.

6 Claims, 5 Drawing Sheets

METHOD OF HEAP OR DUMP LEACHING OF COPPER FROM COPPER SULFIDE ORE

TECHNICAL FIELD

The present invention relates to a method of efficiently leaching copper by heap or dump leaching, in which leaching is carried out by irrigating acid over a layer of a copper sulfide ore, and particularly, a copper sulfide ore comprising ore type which is poorly soluble in a mineral acid, such as chalcopyrite or covellite.

BACKGROUND ART

Regarding leaching methods for recovering copper from a layer of ores, following two methods have been generally known; one is a heap leaching method, comprising agglomerating the ores whose particle size is adjusted, heaping the agglomerates on a high-density polyethylene sheet to an adequate height, and supplying acid over the heap, and another is a dump leaching method, comprising piling the adequately crushed ores, and irrigating leaching solution thereover. However, the most of ores applied in the commercial operations using such leaching methods are limited to copper oxide ore because copper sulfide ore is poorly soluble in mineral acids.

Meanwhile, among copper sulfide ores, chalcocite and bornite are relatively soluble in a moderate acid containing $Fe^{3+}$ or the like. Therefore, heap leaching or dump leaching relative to such ore has been commercially operated in some cases. However, the copper recovery becomes low if the ores to be leached contain poorly soluble copper sulfide ores, such as chalcopyrite.

Hence, a variety of techniques have been suggested in order to increase the leaching rate when a copper sulfide ore with a higher chalcopyrite content is subjected to heap or dump leaching with the use of a mineral acid. For instance, a leaching method comprising adding activated carbon to a leaching solution (JP Patent Publication (Kokai) No. 2007-204830A) and a leaching method comprising adding sliver as a catalyst (J. A. Munoz, D. B. Dreisinger, W. C. Cooper, S. K. Young, Hydrometallurgy, 88, 35 (2007)) have been reported. However, such methods are problematic in terms of environmental burdens and high costs, although these methods are effective for the improvement of the leaching rate. Therefore, neither method has been used in practice.

Meanwhile, it has been known that physical factors significantly affect heap or dump leaching. For example, the total recovery of leached copper and the leaching rate of copper are influenced by whether the irrigated leaching solution is effectively and evenly distributed in the ore layer or not. When a flow channel of the leaching solution is fixed by a phenomenon of "channeling phenomenon", the leaching of copper from the layer of the ore is limited in sites along the fixed flow channel. In order to reclaim and to avoid this phenomenon, a step of irrigating a leaching solution with a sprinkler and a step of setting the resting period of solution supply can be applied. However, none of these steps are sufficiently effective.

DISCLOSURE OF THE INVENTION

As described above, it is difficult to achieve efficient leaching of copper from a copper sulfide ore containing chalcopyrite and/or covellite by heap or dump leaching method. Moreover, the addition of agents which enhance leaching rate, such as silver ions, activated carbons, or the like has been proposed in the past, however, these methods are not practical in terms of environmental burdens and are not commercially feasible.

In addition, in the case of heap or dump leaching method, because a leaching solution is supplied over an accumulated ore, leaching of copper is limited from ores at sites along the flow channels of a leaching solution or at sites at which a leaching solution comes into contact with ore portions. Accordingly, a high copper recovery rate cannot be realized.

The present inventors have established a method comprising an addition of iodine as a catalyst when copper is leached from a copper sulfide ore with the ferric (III) ions as an oxidant (JP Patent Application No. 2008-189258). However, the method is not intended to be used as a heap or dump leaching method. In heap or dump leaching method, it is more difficult to control the factors finely than in a batch-type leaching method or in a leaching method using an agitator, because heap or dump leaching method need to be operated continuously in a large-scale open system. Therefore, in general, the operation conditions differ from those used for batch-type leaching methods.

In view of the above circumstances, it is an object of the present invention to provide a method of efficiently leaching copper from a copper sulfide ore by means of heap or dump leaching under versatile conditions for actual operation.

As a result of intensive studies in order to achieve the above object, the present inventors have found that the copper leaching rate can be significantly improved in the presence of iodine generated by a leaching solution which contains ferric (III) ions and low-concentration of iodide ions (100 mg/L or less) when copper is recovered from a copper sulfide ore containing chalcopyrite and/or covellite by hydrometallurgical method involving heap or dump leaching method. This has led to the completion of the present invention.

Specifically, the present invention encompasses the following inventions.

(1) A method of leaching copper from a copper sulfide ore, characterized by comprising leaching copper from an ore comprising a copper sulfide ore by means of heap or dump leaching with the use of a sulfuric acid solution containing ferric (III) ions and iodide ions at a total iodine concentration of 8 to 100 mg/L as a leaching solution.

(2) The method according to (1), wherein the ore comprising a copper sulfide ore contains chalcopyrite as a main constituent.

(3) The method according to (1) or (2), wherein the ratio of a ferric (III) ion concentration to a total iodine concentration ($Fe^{3+}/I$; by weight) in the leaching solution is greater than or equal to 20:1.

(4) The method according to any one of (1) to (3), wherein ferric (III) ion is added to the leaching solution in a manner such that the proportion of a ferrous (II) ion concentration relative to a total iron concentration ($Fe^{2+}/Fe$) in the pregnant leach solution becomes 20% or more.

Hereinafter the present invention will be described in detail. The present application claims the priority of Japanese Patent Application No. 2009-193197 filed on Aug. 28, 2009 and encompasses contents described in the specification and/or drawings of the patent application.

The method of leaching copper from a copper sulfide ore of the present invention comprises leaching copper from a copper sulfide ore by heap or dump leaching with the use of a sulfuric acid solution containing ferric (III) ions and iodide ions at a total iodine concentration of 100 mg/L or less as a leaching solution.

The target ore of the method of the present invention is not particularly limited as long as it is an ore comprising a copper sulfide ore. However, in a general method, it is preferable to use an ore comprising a copper sulfide ore containing, as a main constituent, chalcopyrite from which it is difficult to leach copper. In addition to an ore comprising a copper sulfide ore containing chalcopyrite as a main constituent, an ore comprising various copper sulfides partially containing chalcopyrite may be optionally used. The chalcopyrite content is not particularly limited. Further, a mixed ore comprising a copper sulfide ore and an oxidized copper ore may be optionally applicable.

The method of the present invention can be used for leaching operations such as heap leaching and dump leaching as long as the method is a heap or dump leaching method involving copper hydrometallurgy with the use of sulfuric acid solution as a leaching solution. In addition, leaching is carried out at an ordinary temperature and thus steam heating or the like is not particularly necessary. Alternatively, the method of the present invention can be a method similar to heap or dump leaching, which comprises introducing a leaching solution into an ore product preserved underground for leaching (in-place leaching).

It is thought that dissolution and leaching of a copper sulfide ore containing chalcopyrite ($CuFeS_2$) and/or covellite (CuS), which is a target ore of the present invention, proceed through the following series of catalyst reactions (formulae 1 to 3) with iodine.

(formula 1)

(formula 2)

(formula 3)

In addition, it has been known that chalcocite ($Cu_2S$) and bornite ($Cu_5FeS_4$) are oxidized by ferric (III) ions ($Fe^{3+}$) so as to be relatively readily dissolved. Such reactions are not inhibited with the addition of iodine. The reactions are represented by the following formulas (formula 4 and formula 5).

(formula 4)

(formula 5)

As shown in the above formulas (1) to (3), copper leaching from the copper sulfide ore is caused via an oxidization reaction by ferric (III) ions ($Fe^{3+}$) accompanying iodine ($I_2$) which plays a role as a catalyst. However, iodine is poorly water soluble. Therefore, an iodide that can readily disassociate into iodide ions ($I^-$) in a leaching solution is added to a leaching solution. Herein, any type of iodide may be used as long as it is water soluble and generates iodide ions. Examples of such iodide that can be used include sodium iodide, potassium iodide, ammonium iodide, and hydrogen iodide. In addition, iodine can be recovered from the leaching solution after leaching for recycling.

In the series of above reaction formulas, ferric (III) ions ($Fe^{3+}$) play a role as final electron acceptors. In addition, it is necessary to supply a $Fe^{3+}$ solution for generation of iodine from iodide ions during a catalyst cycle.

First, in the reaction represented by formula (1), iodide ions ($I^-$) that have disassociated from iodide added to a leaching solution are oxidized by ferric (III) ions ($Fe^{3+}$), then iodine ($I_2$) that plays a role as a catalyst is generated.

The total iodine concentration in a leaching solution is 8 to 100 mg/L and preferably 16 to 100 mg/L in view of cost and leaching rate. Herein, the term "total iodine concentration" refers to the total concentration of iodide ions and iodine and/or tri-iodide ions generated via oxidization of iodide ions. When the total iodine concentration falls within the above range, the copper leaching rate is improved.

Subsequently, in the reactions represented by formula (2) and formula (3), chalcopyrite and covellite are oxidized by iodine ($I_2$) and ferric (III) ions ($Fe^{3+}$) generated in the reaction represented by formula (1), respectively. As a result, copper ions ($Cu^{2+}$) are released.

According to the proceeding of leaching reactions, the iodine ($I_2$) concentration in the leaching solution decreases, as a result, the leaching rate also decreases. Such decrease of the catalyst concentration is mainly caused by consumption of ferric (III) ions ($Fe^{3+}$) in the reactions represented by formula (1) to (5).

Therefore, in the method of the present invention, it is preferable that the ferric (III) ion concentration should be excessive relative to the iodide ion concentration, so that an environment in which iodide ions ($I^-$) can be immediately oxidized to iodine ($I_2$) is maintained and iodine ($I_2$) is continuously reproduced from iodide ions ($I^-$) generated in the reactions represented by formulae (2) and (3).

Specifically, it is necessary that the ratio of the ferric (III) ion concentration to the total iodine concentration ($Fe^{3+}/I$; by weight) in the leaching solution is greater than or equal to 20:1 (i.e., the ferric (III) ion concentration is 2 g/L or more relative to an iodide ion concentration of 100 mg/L).

In addition, ferric (III) ions may be added to a leaching solution in a manner such that the proportion of the ferrous (II) ion concentration relative to the total iron concentration ($Fe^{2+}/Fe$) in the pregnant leach solution becomes 20% or more and preferably 50% to 90%.

The supply source of ferric (III) ions is not particularly limited. Ferric sulfate (III), ferric chloride (III), or a substance obtained by oxidizing ferrous (II) ions in a ferrous sulfate (II) solution may be used as such supply source.

Further, it is preferable to adjust the pH of the leaching solution to 2.5 or less with sulfuric acid or the like in order to prevent precipitation of ferric (III) ions.

A method of preparing a sulfuric acid solution containing ferric (III) ions that is used as a leaching solution is not particularly limited. However, in addition to a method of preparing a sulfuric acid solution by dissolving a compound containing ferric (III) ions, it is possible to use a method comprising chemically oxidizing a solution containing ferrous (II) ions with an oxidant such as air, ozone, or hypochlorous acid and a method comprising biologically oxidizing a solution containing ferrous (II) ions with an iron-oxidizing microorganism. In addition, it is possible to use a solution obtained as a result of heap leaching or dump leaching, a solution obtained as a result of solvent extraction or from mine wastewater including acid mine drainage or the like, which contain ferric (III) ions in sufficient volumes.

Further, a solution containing chloride ions can be used as a sulfuric acid solution. However, even if such solution contains no chloride ions, there will be no influence on copper leaching.

As described above, iodine functions as a catalyst in the copper leaching system in the method of the present invention. Iodine is poorly soluble in water and thus it is readily evaporated and diffused. Therefore, iodine is diffused not only around the leaching solution channels but also the horizontal direction so that the leachable site is expanded. According to the method of the present invention, a channeling phenomenon that is problematic in existing heap leaching methods is prevented so that the copper leaching efficiency can be improved. In addition, in order to enhance evaporation-diffusion effects, it is further preferable to supply air at an adequate flow rate into a heap.

BEST MODES FOR CARRYING OUT THE INVENTION

Hereinafter, the present invention is more specifically described by way of examples. However, the present invention is not limited thereto.

Example 1

Copper Leaching Promotion Effects in the Co-Presence of Iodide Ions and Ferric (III) Ions in a Multilayer Ore Column A copper concentrate (0.5 kg) (mined in Candelaria) containing chalcopyrite as a main constituent was mixed with sand (commercially available sand for breeding tropical fish) (9.5 kg) with a mixer. The mixture was used as simulated ore. The quality of the obtained copper concentrate was as follows: Cu=28% by mass; Fe=28% by mass; and S=32% by mass.

In the above case, the copper quality is 1.4%.

The above simulated ore was loaded into a transparent polyvinyl chloride pipe (diameter: 10 cm; height: 1 m) for formation of a heap. Filter cloth and a polyvinyl chloride mesh dish were fixed to the bottom portion of the vinyl chloride pipe such that the pipe had a structure that allowed leaching solution to pass therethrough. Sulfuric acid was added to the leaching solution to adjust the pH to 1.8. Then, sodium chloride (20 g/L) was added thereto. Also, potassium iodide and ferric sulfate (III) were added (or not added) thereto at the corresponding concentrations described below. Each leaching solution was added dropwise and supplied to the pipe with the use of a pump (leaching conditions A to M). The rate of supply of the leaching solution was approximately 2 L/day. In addition, in the case of leaching carried out under leaching condition G, air blowing was performed at a rate of 0.1 L/minute.

(Leaching Condition A)
Potassium iodide: 130 mg/L (iodine concentration: 100 mg/L)
Ferric sulfate (III): 5 g/L ($Fe^{3+}$ concentration)
(Leaching Condition B)
Potassium iodide: 60 mg/L (iodine concentration: 50 mg/L)
Ferric sulfate (III): 5 g/L ($Fe^{3+}$ concentration)
(Leaching Condition C)
Potassium iodide: 30 mg/L (iodine concentration: 25 mg/L)
Ferric sulfate (III): 5 g/L ($Fe^{3+}$ concentration)
(Leaching Condition D)
Potassium iodide: 20 mg/L (iodine concentration: 16 mg/L)
Ferric sulfate (III): 5 g/L ($Fe^{3+}$ concentration)
(Leaching Condition E)
Potassium iodide: 10 mg/L (iodine concentration: 8 mg/L)
Ferric sulfate (III): 5 g/L ($Fe^{3+}$ concentration)
(Leaching Condition F)
Potassium iodide: Not added
Ferric sulfate (III): 5 g/L ($Fe^{3+}$ concentration)
(Leaching Condition G)
Potassium iodide: 30 mg/L (iodine concentration: 25 mg/L)
Ferric sulfate (III): 5 g/L ($Fe^{3+}$ concentration)
Air blowing (0.1 L/minute)
(Leaching Condition H)
Potassium iodide: 130 mg/L (iodine concentration: 100 mg/L)
Ferric sulfate (III): 2 g/L ($Fe^{3+}$ concentration)
(Leaching Condition I)
Potassium iodide: 60 mg/L (iodine concentration: 50 mg/L)
Ferric sulfate (III): 2 g/L ($Fe^{3+}$ concentration)
(Leaching Condition J)
Potassium iodide: 30 mg/L (iodine concentration: 25 mg/L)
Ferric sulfate (III): 2 g/L ($Fe^{3+}$ concentration)
(Leaching Condition K)
Potassium iodide: 20 mg/L (iodine concentration: 16 mg/L)
Ferric sulfate (III): 2 g/L ($Fe^{3+}$ concentration)
(Leaching Condition L)
Potassium iodide: 10 mg/L (iodine concentration: 8 mg/L)
Ferric sulfate (III): 2 g/L ($Fe^{3+}$ concentration)
(Leaching Condition M)
Potassium iodide: Not added
Ferric sulfate (III): 2 g/L ($Fe^{3+}$ concentration)

Figure 1:
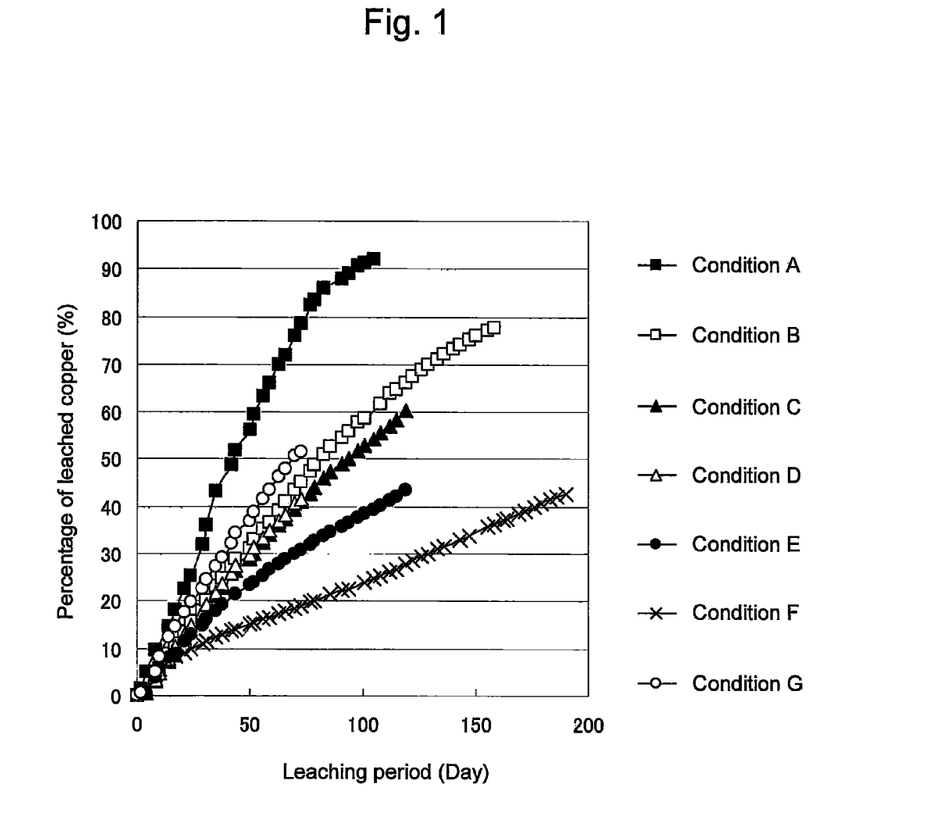
FIG. 1 shows time course changes in the percentages of leached copper when leaching of copper (simulated ore) was carried out under leaching conditions A to G ($Fe^{3+}$ concentration: 5 g/L; iodine concentration: 100, 50, 25, 16, 8, or 0 mg/L).
Figure 2:
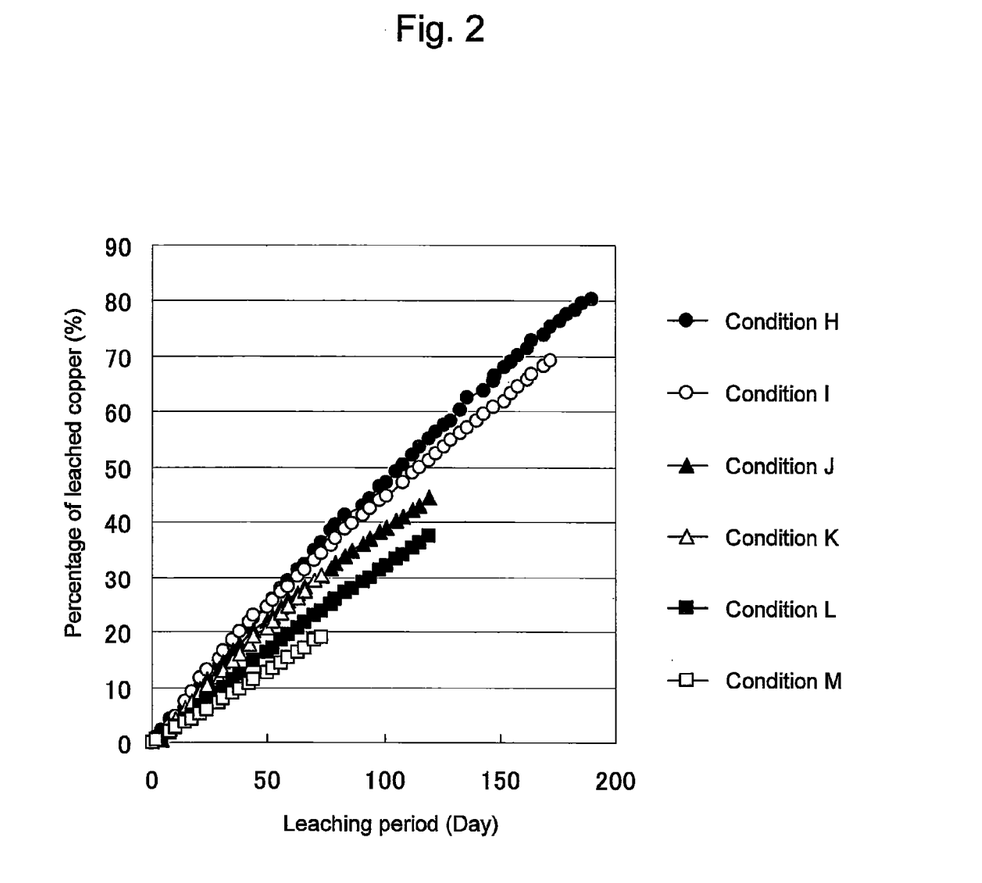
FIG. 2 shows time course changes in the percentages of leached copper when leaching of copper (simulated ore) was carried out under leaching conditions H to M ($Fe^{3+}$ concentration: 2 g/L; iodine concentration: 100, 50, 25, 16, 8, or 0 mg/L).

Regarding copper leaching that had been carried out under leaching conditions A to M, time course changes in the copper concentrations in the pregnant leach solution were determined with an ICP atomic emission spectrometer (ICP-AES). In addition, the volume of each solution after leaching was measured so as to convert the copper concentration into the percentage of leached copper. FIGS. 1 and 2 show time course changes in percentages of leached copper. Further, Table 1 lists percentages of leached copper on Day 70 and Day 101 of copper leaching carried out under leaching conditions A to M.

TABLE 1

| Leaching conditions | Iodine concentration (mg/L) | Ferric (III) ion concentration (g/L) | $Fe^{3+}/I$ | Percentage of leached copper (%) | |
|---|---|---|---|---|---|
| | | | | Day 70 | Day 101 |
| A | 100 | 5 | 50 | 76 | 91 |
| B | 50 | 5 | 100 | 43 | 59 |
| C | 25 | 5 | 200 | 40 | 53 |
| D | 16 | 5 | 312.5 | 41 | — |
| E | 8 | 5 | 625 | 30 | 39 |
| F | 0 | 5 | 0 | 19 | 24 |
| G | 25 | 5 (air blowing) | 200 | 51 | — |
| H | 100 | 2 | 20 | 35 | 47 |
| I | 50 | 2 | 40 | 33 | 45 |
| J | 25 | 2 | 80 | 29 | 39 |

TABLE 1-continued

| Leaching conditions | Iodine concentration (mg/L) | Ferric (III) ion concentration (g/L) | $Fe^{3+}/I$ | Percentage of leached copper (%) Day 70 | Day 101 |
|---|---|---|---|---|---|
| K | 16 | 2 | 125 | 30 | — |
| L | 8 | 2 | 250 | 23 | 32 |
| M | 0 | 2 | 0 | 19 | — |

—: Not determined

The above results indicate that copper leaching in the co-presence of iodide ions and ferric (III) ions in a multilayer ore column can be carried out with the use of ferric (III) ions in an amount that is excessively larger than that of iodide ions. Specifically, it was confirmed that the copper leaching rate was promoted in each case in which the ratio of ferric (III) ion to the total iodine concentration ($Fe^{3+}/I$) is greater than or equal to 20:1.

Figure 3:
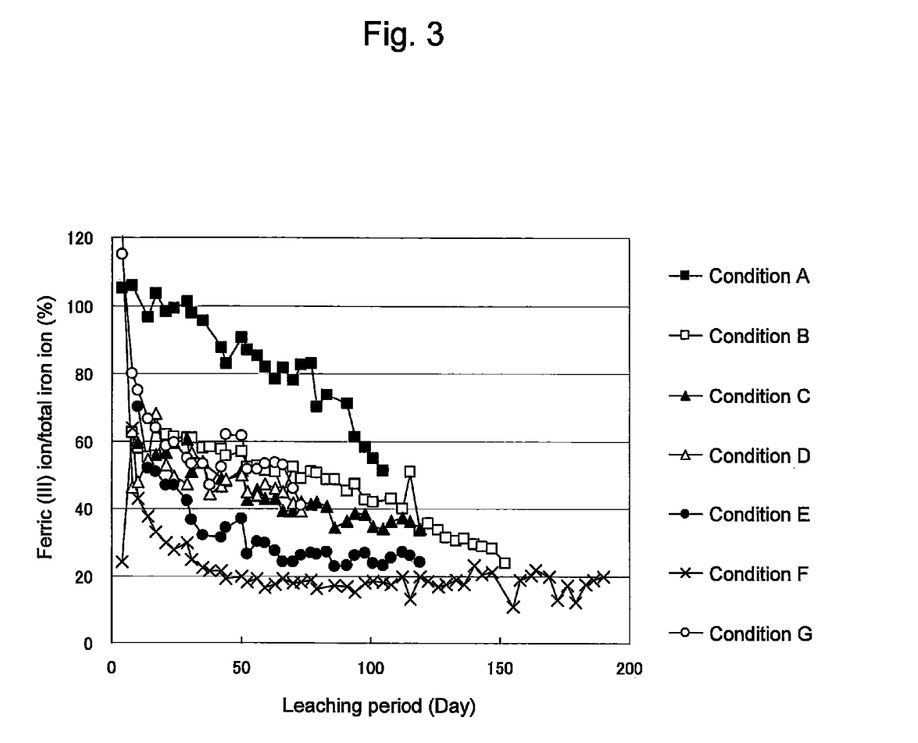
FIG. 3 shows time course changes in the proportions of $Fe^{2+}$ relative to Fe in the leaching solution after leaching when leaching of copper (simulated ore) was carried out under leaching conditions A to G ($Fe^{3+}$ concentration: 5 g/L; iodine concentration: 100, 50, 25, 16, 8, or 0 mg/L).
Figure 4:
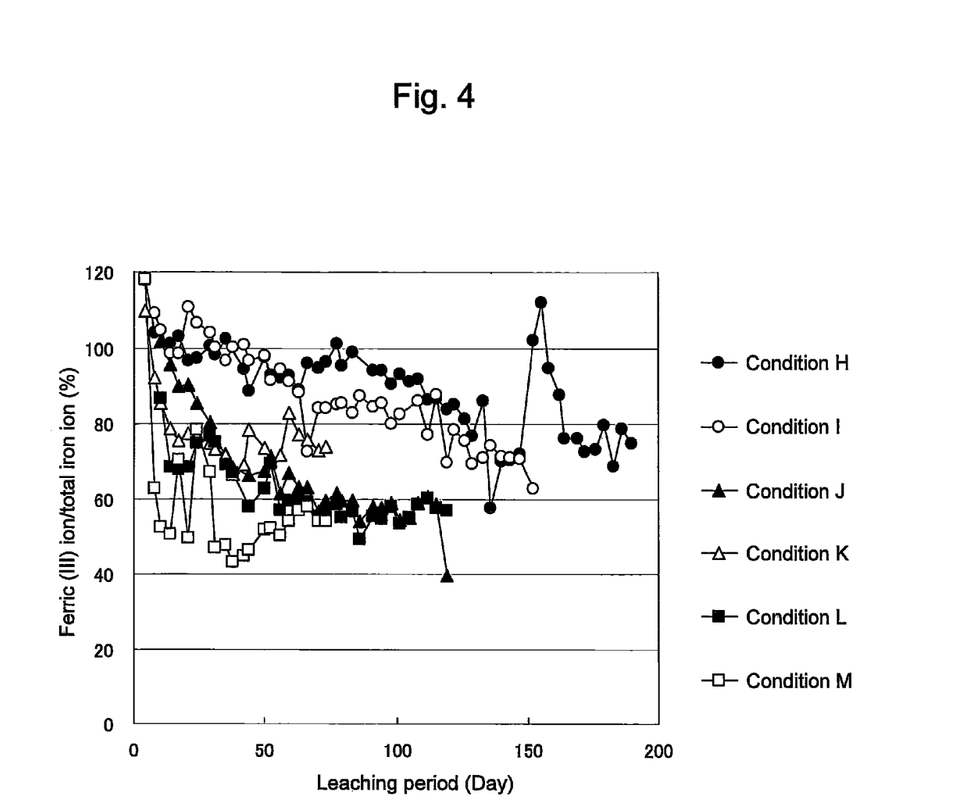
FIG. 4 shows time course changes in the proportions of $Fe^{2+}$ relative to Fe in the leaching solution after leaching when leaching of copper (simulated ore) was carried out under leaching conditions H to M ($Fe^{3+}$ concentration: 2 g/L; iodine concentration: 100, 50, 25, 16, 8, or 0 mg/L).

In addition, FIGS. 3 and 4 show the time course changes in the proportion of the ferrous (II) ions relative to the total iron in the pregnant leach solution. The ferrous (II) ion concentration was determined by the potassium dichromate titrimetry method using phosphoric acid and diphenylamine sulfonic acid as indicators. In this method, reductants such as an iodide ion cause positive errors and therefore the theoretical concentration proportion might exceed 100% in some cases. Herein, the total iron concentration was determined with an ICP atomic emission spectrometer (ICP-AES) after each solution obtained as a result of leaching had been adequately diluted.

In the case of leaching under leaching conditions (leaching conditions A to E and G) in which the copper leaching rate was confirmed to be significantly improved with respect to the amount of iodine which plays a role as a catalyst, the proportion of the ferrous (II) ion concentration relative to the total iron concentration in each pregnant leach solution was 20% or more, as shown in FIG. 3. The proportion of ferrous (II) ions relative to the total iron concentration is derived exclusively from ferric (III) ions serving as acids (electron acceptors) and ferrous (II) ions leached from chalcopyrite. Therefore, it can be considered that the proportion has a strong positive correlation to ferric (III) ions that have effectively acted as acids on chalcopyrite. Accordingly, if the proportion of the ferrous (II) ion concentration relative to the total iron concentration in the pregnant leach solution is less than 20%, it is judged that ferric (III) ions do not sufficiently function as acids, indicating lack of iodine or excessive supply of ferric (III) ions. Further, as shown by comparison between leaching condition A, which resulted in the highest leaching efficiency, and the other leaching conditions, even if the proportion of the ferrous (II) ion concentration relative to the total iron concentration was 40% to 50%, the leaching rate can be improved as the iodine concentration is increased. In such case, it is thought that the leaching rate would not significantly decrease even if the $Fe^{3+}$ concentration were to decrease to some extent.

Meanwhile, FIG. 4 shows a case in which the proportion of the ferrous (II) ion concentration relative to the total iron concentration is approximately 100% (e.g., under leaching conditions H and I). In such example, the increase in the copper leaching rate is moderate to an extent that is not proportional to the amount of iodide ions added (FIG. 2 and Table 1). This is probably because of lack of ferric (III) ions serving as electron acceptors.

The above results indicate that leaching can be carried out in a functional manner without deficiency or excess of ferric (III) ions by predetermining the ferric (III) ion concentration in a manner that the proportion of ferrous (II) ions relative to total irons in the pregnant leach solution becomes 20% or more, and preferably 50% to 90%.

Example 2

Copper Leaching Promotion Effects in the Co-Presence of Iodide Ions and Ferric (III) Ions in a Multilayer Column Loaded with a Low-Grade Crude Copper Sulfide Ore A crude ore (mined in Chile) was examined to be used as a low-grade copper sulfide ore. The quality of the crude ore was as follows: Cu: 0.8 mass %; Fe: 5.9 mass %; and S: 2.7 mass %.

The above crude ore was loaded into a transparent polyvinyl chloride pipe (diameter: 10 cm; height: 1 m) for formation of a heap. Filter cloth and a polyvinyl chloride mesh dish were fixed to the bottom portion of the polyvinyl chloride pipe that had a structure that allowed a leaching solution to pass therethrough. Sulfuric acid was added to a leaching solution to adjust the pH to 1.8. Then, sodium chloride (20 g/L) was added thereto. Also, potassium iodide and ferric sulfate (III) were added (or not added) thereto at the corresponding concentrations described below. The leaching solution was added dropwise and supplied to the pipe with the use of a pump (leaching conditions N and O). The rate of supply of the leaching solution was approximately 2 L/day.

(Leaching Condition N)
Potassium iodide: 130 mg/L (iodine concentration: 100 mg/L)
Ferric sulfate (III): 2 g/L ($Fe^{3+}$ concentration)
(Leaching condition O)
Potassium iodide: Not added
Ferric sulfate (III): 2 g/L ($Fe^{3+}$ concentration)

Figure 5:
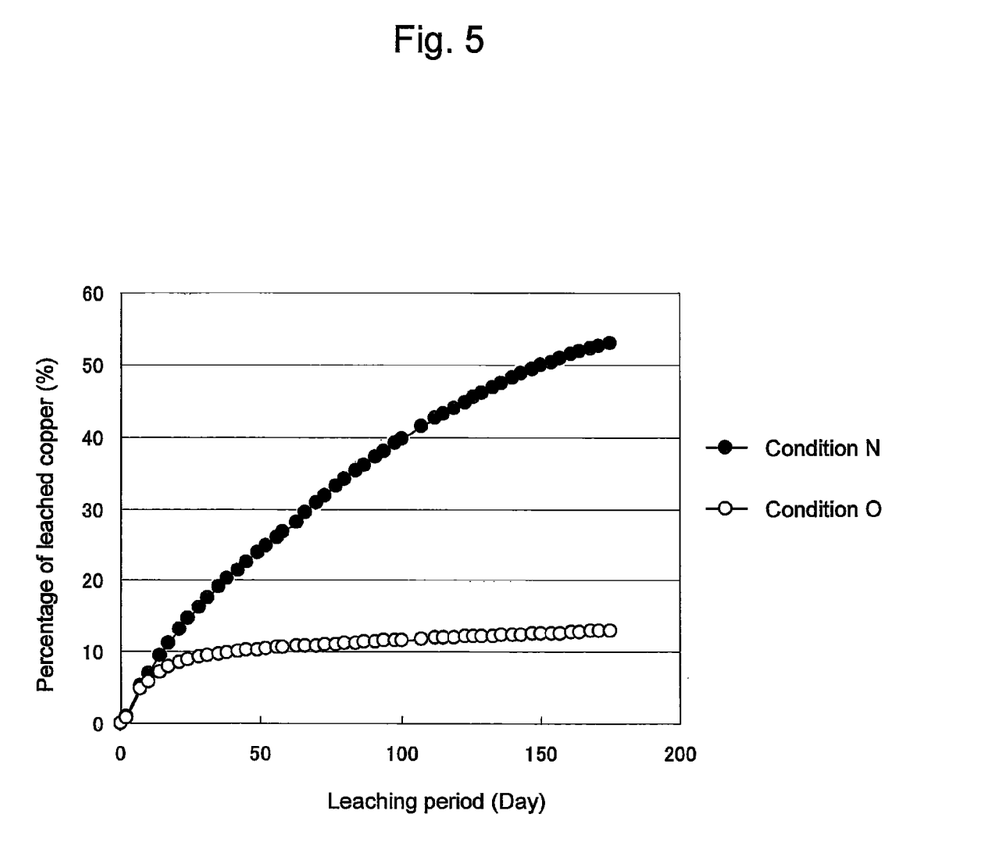
FIG. 5 shows time course changes in the percentages of leached copper when leaching of copper (crude ore mined in Chile) was carried out under leaching conditions of N and O ($Fe^{3+}$ concentration: 2 g/L; iodine concentration: 100 or 0 mg/L).

Regarding copper leaching carried out under leaching conditions N and O, the time course changes in the copper concentrations in the pregnant leach solution were determined with an ICP atomic emission spectrometer (ICP-AES). In addition, the volume of each pregnant leach solution was measured so as to convert the copper concentration into the percentage of leached copper. FIG. 5 shows the time course changes in percentages of leached copper.

As it is apparent from FIG. 5, it has been shown that the addition of iodide ions is obviously effective for promotion of copper leaching from a low-grade crude ore.

INDUSTRIAL APPLICABILITY

According to the method of the present invention, copper can be efficiently leached not only from readily-soluble chalcocite or bornite but also from a poorly soluble copper sulfide ore containing chalcopyrite, covellite, and the like at an ordinary temperature by a heap or dump leaching method. In addition, as a result of diffusion of iodine which plays a role as a catalyst, leaching achieved widely and evenly, resulting in the improvement of copper leaching efficiency.

What is claimed is:
1. A method of leaching copper from a copper sulfide ore, comprising
leaching copper from an ore comprising a copper sulfide ore by means of heap or dump leaching with the use of a sulfuric acid solution containing ferric (III) ions and iodide ions at a total iodine concentration of 8 to 100 mg/L as a leaching solution, wherein a ratio of a ferric (III) ion concentration to a total iodine concentration ($Fe^{3+}/I$) by weight in the leaching solution is greater than or equal to 20:1.

2. The method according to claim 1, wherein the ore comprising a copper sulfide ore contains chalcopyrite as a main constituent.

3. The method according to claim 1, wherein ferric (III) ion is added to the leaching solution in a manner that a proportion of a ferrous (II) ion concentration relative to a total iron concentration ($Fe^{2+}/Fe$) in a pregnant leach solution becomes 20% or more.

4. The method according to claim 2, wherein ferric (III) ion is added to the leaching solution in a manner that a proportion of a ferrous (II) ion concentration relative to a total iron concentration ($Fe^{2+}/Fe$) in a pregnant leach solution becomes 20% or more.

5. A method of leaching copper from a copper sulfide ore, comprising leaching copper from an ore comprising a copper sulfide ore by means of heap or dump leaching with the use of a sulfuric acid solution containing ferric (III) ions and iodide ions at a total iodine concentration of 8 to 100 mg/L as a leaching solution, wherein ferric (III) ion is added to the leaching solution in a manner that a proportion of a ferrous (II) ion concentration relative to a total iron concentration ($Fe^{2+}/Fe$) in a pregnant leach solution becomes 20% or more.

6. The method according to claim 5, wherein the ore comprising a copper sulfide ore contains chalcopyrite as a main constituent.

* * * * *